United States Patent
Hirai et al.

(10) Patent No.: US 9,358,507 B2
(45) Date of Patent: Jun. 7, 2016

(54) COMPOSITE MEMBRANE

(75) Inventors: Keita Hirai, Tokyo (JP); Hiroyoshi Fujimoto, Tokyo (JP)

(73) Assignee: W.L. Gore & Associates, Co., Ltd., Tokyo (JP)

( * ) Notice: Subject to any disclaimer, the term of this patent is extended or adjusted under 35 U.S.C. 154(b) by 209 days.

(21) Appl. No.: 14/008,584

(22) PCT Filed: Mar. 30, 2012

(86) PCT No.: PCT/JP2012/058641
§ 371 (c)(1),
(2), (4) Date: Dec. 16, 2013

(87) PCT Pub. No.: WO2012/133805
PCT Pub. Date: Oct. 4, 2012

(65) Prior Publication Data
US 2014/0110332 A1    Apr. 24, 2014

(30) Foreign Application Priority Data

Mar. 30, 2011   (JP) .................................. 2011-075382

(51) Int. Cl.
*B01D 29/46* (2006.01)
*B01D 29/00* (2006.01)
*B01D 71/28* (2006.01)
*B01D 39/00* (2006.01)
(Continued)

(52) U.S. Cl.
CPC .............. *B01D 69/12* (2013.01); *B01D 61/364* (2013.01); *B01D 63/082* (2013.01); *B01D 65/10* (2013.01); *B32B 27/12* (2013.01); *C02F 1/44* (2013.01); *B32B 2305/026* (2013.01); *B32B 2307/724* (2013.01); *C02F 1/447* (2013.01); *C02F 2103/08* (2013.01)

(58) Field of Classification Search
CPC .... B01D 61/362; B01D 69/12; B01D 53/228; B01D 69/10; B01D 61/36; B01D 71/28; B01D 71/54; B01D 71/38; B01D 71/32; B01D 69/02; B32B 5/01
USPC ......................... 210/490, 500.42, 500.36, 640
See application file for complete search history.

(56) References Cited

U.S. PATENT DOCUMENTS 4,802,988 A * 2/1989 Bartels ................. B01D 61/362
                                                        210/640
4,971,699 A * 11/1990 Bartels ................. B01D 61/362
                                                        210/640
(Continued)

FOREIGN PATENT DOCUMENTS

EP        2145916        1/2010
JP        59-203602      11/1984
(Continued)

OTHER PUBLICATIONS

International Search Report of PCT/JP2012/058641 dated Jun. 26, 2012.

*Primary Examiner* — Ana Fortuna

(57) ABSTRACT

The present invention is intended to provide a composite membrane excellent in both durability and moisture permeability.
The present invention provides a composite membrane formed by laminating a layer of a moisture-permeable resin on one surface of a hydrophobic porous membrane, the composite membrane being characterized in that the layer of the moisture-permeable resin is included in a reinforcing porous membrane.

13 Claims, 3 Drawing Sheets

(a) FUNCTION LAYER (HYDROPHILIC RESIN LAYER)
REINFORCING LAYER (REINFORCING POROUS MEMBRANE)

(b) FUNCTION LAYER (HYDROPHILIC RESIN LAYER)
REINFORCING LAYER (REINFORCING POROUS MEMBRANE)
HYDROPHOBIC POROUS LAYER (HYDROPHOBIC POROUS MEMBRANE)

(51) Int. Cl.
*B01D 69/12* (2006.01)
*B01D 63/08* (2006.01)
*B32B 27/12* (2006.01)
*B01D 61/36* (2006.01)
*B01D 65/10* (2006.01)
*C02F 1/44* (2006.01)
*C02F 103/08* (2006.01)

(56) References Cited

U.S. PATENT DOCUMENTS

| | | | | |
|---|---|---|---|---|
| 5,004,861 A | * | 4/1991 | Pasternak | B01D 61/362 210/644 |
| 5,141,649 A | * | 8/1992 | Pasternak | B01D 61/362 210/321.72 |
| 5,418,054 A | | 5/1995 | Sun | |
| 5,681,433 A | * | 10/1997 | Friesen | B01D 53/22 159/DIG. 27 |
| 6,062,866 A | * | 5/2000 | Prom | G09B 23/28 434/262 |
| 8,256,626 B2 | * | 9/2012 | Hubner | B01D 61/362 210/500.21 |
| 2003/0034304 A1 | * | 2/2003 | Huang | B01D 61/362 210/640 |
| 2004/0000521 A1 | * | 1/2004 | Vane | B01D 61/362 210/640 |
| 2006/0090650 A1 | | 5/2006 | Yamakawa et al. | |
| 2008/0099400 A1 | * | 5/2008 | Nemser | B01D 61/362 210/638 |
| 2009/0324929 A1 | * | 12/2009 | Yamakawa | B01D 63/082 428/315.9 |
| 2014/0110332 A1 | * | 4/2014 | Hirai | B01D 63/082 210/496 |

FOREIGN PATENT DOCUMENTS

| | | |
|---|---|---|
| JP | 61-57205 | 3/1986 |
| JP | 1-199625 | 8/1989 |
| JP | 2-135118 | 5/1990 |
| JP | 2000-350918 | 12/2000 |
| JP | 2009-72701 | 4/2009 |

* cited by examiner

COMPOSITE MEMBRANE

TECHNICAL FIELD

The present invention relates to a novel composite membrane. More specifically, the invention relates to a composite membrane formed by laminating a moisture-permeable resin layer on one surface of a hydrophobic porous membrane, the composite membrane having the moisture-permeable resin layer included in a reinforcing porous membrane and, in particular, exhibiting excellent performance in water vapor separation properties.

BACKGROUND ART

With drought, desertification, water environment deterioration, etc., all of which are worsening in recent years, water treatment techniques are more important than ever before, and a separation membrane utilization technique has been widely applied. As for sea water desalination, the development of reverse osmosis technology has increased reliability and reduced costs. Due to the adoption of a desalination process using reverse osmosis membrane, many reverse osmosis desalination plants have been built and are operating in areas with extremely scarce water resources, such as the Middle East, Caribbean Islands, and the Mediterranean.

On the other hand, as a technique for obtaining fresh water from sea water, a process referred to as the membrane distillation method that uses heat as a driving force to obtain fresh water via a membrane as with an evaporation method, has been proposed and is under consideration.

The membrane distillation method is, in general, a membrane separation method utilizing the properties of a porous hydrophobic membrane (Patent Literature 1). A description will now be given of the mechanism of the membrane distillation method, with reference to FIG. 1. When one surface of the porous hydrophobic membrane comes into contact with high-temperature primary water (a solution such as sea water) and the other surface of the membrane comes into contact with low-temperature fresh water (pure water), the hydrophobicity of the membrane stops the primary water on the membrane surface and inhibits the permeation of the primary water (as liquid) through the membrane. On the other hand, gas can permeate through the porous membrane. Thus, the permeation of water vapor evaporating from the high-temperature primary water through the membrane and the condensation of the permeated water vapor in the low temperature section allow the separation of only water from the primary water (solution). In other words, in the membrane distillation method, high-temperature supplied water flows onto one side of the membrane and is isolated thereby from a cooling surface provided on the other side of the membrane, whereby a vapor pressure difference due to an occurring temperature difference is used as a driving force for vapor permeation. The problem with the membrane distillation method is that when high-temperature supplied water contains a volatile component, the volatile component easily permeates. Nevertheless, the method exhibits extremely high performance in separation of nonvolatile solutes. Accordingly, for example, highly-pure fresh water can be obtained from sea water containing nonvolatile salt as a main solute.

The basic principle of the membrane distillation method is the same as the evaporation method. However, as compared to the evaporation method, the membrane distillation method has the following advantages:

There is a lot of flexibility in the membrane shape and few limitations on the apparatus shape.

An increase in membrane packing density allows a reduction of the apparatus size.

Due to the mechanism based on the vapor pressure difference, utilization at relatively low temperatures below the boiling point is feasible, and when exhaust heat or water sources having different temperatures can be utilized, there are great energy savings.

Since the solution and permeated water do not come in direct contact, it is almost unnecessary to consider osmotic pressure as in the reverse osmosis method, and the power cost is very low.

CITATION LIST

Patent Literature

[Patent Literature 1] Japanese Laid-open Patent Publication No. 61-57205
[Patent Literature 2] Japanese Laid-open Patent Publication No. 59-203602
[Patent Literature 3] Japanese Laid-open Patent Publication No. 2010-5515

SUMMARY OF INVENTION

Meanwhile, the major and essential problem of the membrane distillation method is that when the membrane surface is contaminated, the water vapor evaporation surface is blocked due to the contamination, and there is a risk that the hydrophobicity of the membrane is lost, finally causing the supplied water to infiltrate into the porous hydrophobic membrane and then leak out to the cooling side (the permeation side).

In order to solve the problem, a method has been proposed that forms a composite membrane by placing a hydrophilic resin membrane on a surface of a porous hydrophobic membrane (Patent Literature 2).

However, in this method, the hydrophilic resin membrane becomes swollen when it comes into contact with primary water, thereby deteriorating the strength of the membrane. Thus, problems occur such as abrasion, cracks in the membrane, and pin holes, depending on the flow rate of the primary water.

In order to solve the problem of strength deterioration in the use of a hydrophilic resin membrane, a method has been proposed in which the hydrophobic porous membrane is arranged also on a surface of the hydrophilic resin membrane to sandwich the hydrophilic resin membrane between the hydrophobic porous membranes (Patent Literature 3).

In this method, the hydrophilic resin layer is not in direct contact with primary water and the surfaces of the hydrophilic resin layer are reinforced by the hydrophobic porous membranes, which is an advantage, thus improving the durability of the composite membrane. However, since the hydrophilic resin layer is not in direct contact with the raw water, the permeation rate of water vapor is sometimes insufficient.

Thus, the present invention has been accomplished to solve the problems described above, and it is an object of the invention to provide a composite membrane excellent in both durability and moisture permeability.

The present invention provides the following:

(1) A composite membrane formed by laminating a layer of a moisture-permeable resin on one surface of a hydrophobic porous membrane, the composite membrane being characterized in that the layer of the moisture-permeable resin is included in a reinforcing porous membrane.

(2) The composite membrane according to (1), characterized in that the layer of the moisture-permeable resin is exposed out of an upper surface of the reinforcing porous membrane.

(3) The composite membrane according to (1) or (2), characterized in that the layer of the moisture-permeable resin is exposed out of a lower surface of the reinforcing porous membrane.

(4) The composite membrane according to (3), characterized in that at least a part of the layer of the moisture-permeable resin exposed out of the lower surface of the reinforcing porous membrane is included into the hydrophobic porous membrane but is not exposed out of a lower surface of the hydrophobic porous membrane.

(5) The composite membrane according to any one of (1) to (4), characterized in that the layer of the moisture-permeable resin has a thickness of 25 μm or less.

(6) The composite membrane according to any one of (1) to (5), characterized in that the layer of the moisture-permeable resin has a thickness of 10 μm or less.

(7) The composite membrane according to any one of (1) to (6), characterized in that the layer of the moisture-permeable resin has a thickness of 5 μm or less.

(8) The composite membrane according to any one of (1) to (7), characterized in that the moisture-permeable resin has swelling properties in which a swelling degree obtained from a volume change of the resin between before and after a water resistance test as described below is from 2 to 20 times; the swelling degree=the resin volume after the water resistance test/the resin volume before the water resistance test; and the water resistance test: the resin is allowed to stand for 24 hours in an environment with a temperature of 120° C. and a water vapor pressure of 0.23 MPa and then immersed in water with a temperature of 25° C. for 15 minutes.

(9) The composite membrane according to any one of (1) to (8), characterized in that the moisture-permeable resin is any of a polystyrene sulfonic acid, a polyvinyl alcohol, a vinyl alcohol copolymer, a fluorine-based ion exchange resin, a resin having a protic hydrophilic group in the repeating unit thereof, and a resin having an aprotic hydrophilic group in the repeating unit thereof.

(10) The composite membrane according to any one of (1) to (9), characterized in that the moisture-permeable resin is any of a fluorine-based ion exchange resin, a polyvinyl alcohol, and a polyurethane.

(11) The composite membrane according to any one of (1) to (10), characterized in that the reinforcing porous membrane is an expanded PTFE membrane.

(12) The composite membrane according to any one of (1) to (11), characterized in that an air-permeable reinforcing material is laminated on a surface of the hydrophobic porous membrane opposite to the surface of the hydrophobic porous membrane having the layer of the moisture-permeable resin laminated thereon.

(13) The composite membrane according to (12), characterized in that the air-permeable reinforcing material is any of a woven fabric, a nonwoven fabric, and a net.

(14) The composite membrane according to any one of (1) to (13), characterized in that the composite membrane is used as a water vapor separation membrane.

DESCRIPTION OF EMBODIMENTS (i) Composite Membrane

Hereinbelow, a composite membrane of the present invention will be described in detail with reference to the drawings.

Figure 1:
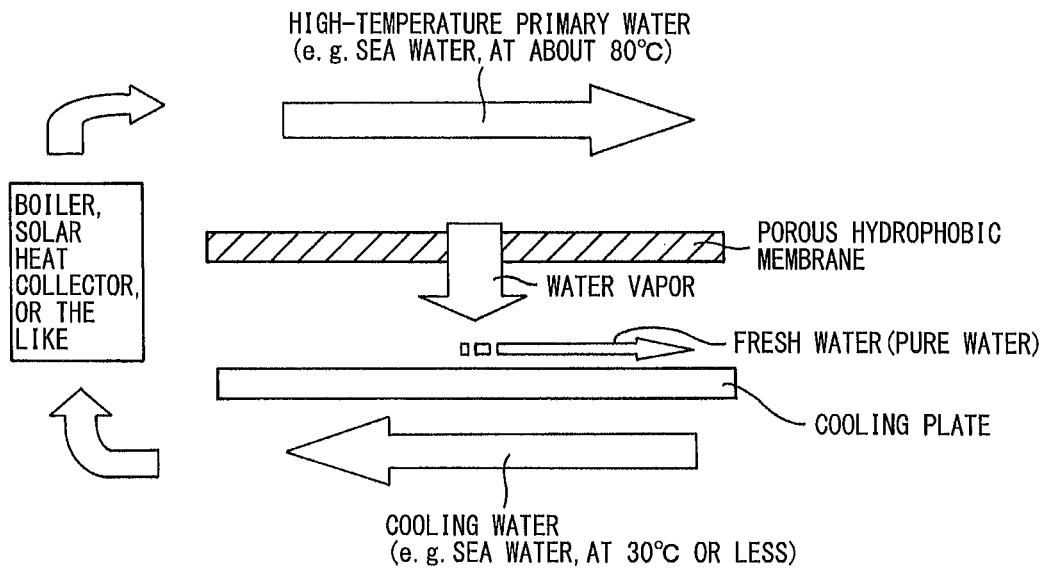
FIG. 1 is a schematic diagram for illustrating the mechanism of membrane distillation.
Figure 2:
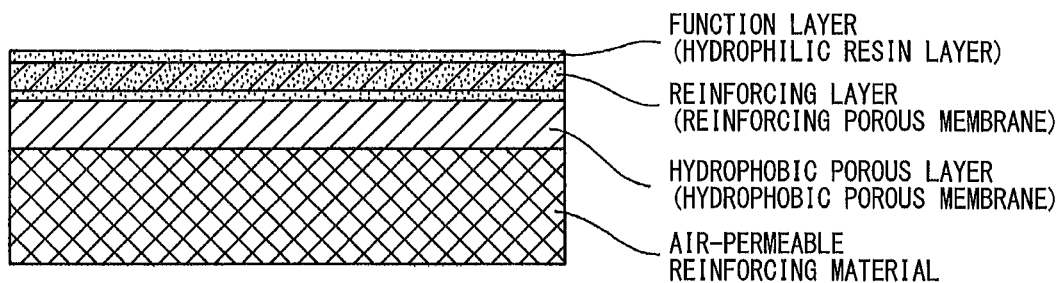
FIG. 2 is a schematic cross-sectional view depicting one example of a composite membrane of the present invention.

FIG. 2 is a schematic cross-sectional view for illustrating one example of the composite membrane of the present invention. As illustrated in FIG. 2, in the composite membrane of the present invention, a layer of a moisture-permeable resin (function layer) is laminated on one surface of a hydrophobic porous membrane and additionally, the layer of the moisture-permeable resin is included in a reinforcing porous membrane.

The composite membrane of the present invention exhibits excellent surface durability when it comes into contact with an outer member, due to the reinforcement of the layer of the moisture-permeable resin by the reinforcing porous membrane. Accordingly, the composite membrane does not have abrasion, cracks, or pin holes. If abrasion, cracks, pin holes, or the like occur in a portion, gas barrier properties are deteriorated, causing the permeation of gas or liquid though the portion. In order to prevent abrasion, cracks, pin holes, and the like to ensure the gas barrier properties, the entire thickness of the layer of the moisture-permeable resin needs to be made thick. In this case, moisture permeability is low. However, since the composite membrane of the present invention is excellent in surface durability, the layer of the moisture-permeable resin can be made thin and thus high moisture permeability is achieved.

The layer of the moisture-permeable resin may be exposed out of an upper surface of the reinforcing porous membrane. With this arrangement, when using the composite membrane as a separation membrane for selectively permeating water contained in gas or liquid (a separation membrane for a moisture content adjustment module), such as a membrane for membrane distillation, the moisture-permeable resin can be in direct contact with primary water, thereby achieving an excellent moisture permeation performance. Patent Literature 3 proposes a method for sandwiching a resin membrane between hydrophobic porous membranes, where the resin membrane cannot come into direct contact with raw water. In this respect, the composite membrane of the present invention has a more improved moisture permeation performance than the composite membrane of Patent Literature 3.

The layer of the moisture-permeable resin may be exposed out of a lower surface of the reinforcing porous membrane. The exposed portion of the layer of the moisture-permeable resin is present in contact with the reinforcing porous membrane and the hydrophobic porous membrane. When the moisture-permeable resin is in contact with a material having a relatively large fiber size, such as a nonwoven fabric, a pool of the moisture-permeable resin liquid is formed at a boundary portion between the resin and the fiber of the nonwoven fabric, whereby the thickness of the moisture-permeable resin can be uneven. Uneven thickness of the resin is likely to cause pin holes at a relatively thin portion. In that case, measures against pin holes have been taken by increasing the entire thickness of the layer of the moisture-permeable resin or in other ways. In the present invention, the moisture-permeable resin is in contact with the porous membranes and the surface roughnesses (pore sizes) of the porous membranes are much smaller than the fiber size of a nonwoven fiber or the like. Thus, the formation of a pool of the moisture-permeable resin liquid can be prevented. This allows the moisture-permeable resin to be present with an even thickness and thereby the occurrence of pin holes can be prevented. Eventually, the layer of the moisture-permeable resin does not need to be made thick, thus achieving high moisture permeability.

The layer of the moisture-permeable resin may be formed on the surface of the hydrophobic porous membrane without being included into the porous membrane. Alternatively, at least a part of the layer of the moisture-permeable resin may be included into an inside of the hydrophobic porous membrane. When the layer of the moisture-permeable resin is included into the hydrophobic porous membrane, the layer has an anchor effect to pores inside the hydrophobic porous membrane, thereby improving durability. However, the layer of the moisture-permeable resin included inside the hydrophobic porous membrane is not exposed out of the lower surface of the hydrophobic porous membrane. In other words, a laminar region composed of only the hydrophobic porous membrane is present throughout the entire surface of the composite membrane of the present invention and inhibits the permeation of liquid.

The composite membrane can be produced, for example, by the following method: a liquid containing the moisture-permeable resin is applied on or impregnated in the reinforcing porous membrane in advance, and after a solvent is removed from the applied or impregnated liquid by washing, drying, and the like, the reinforcing porous membrane is thermo-compressively bonded to the hydrophobic porous membrane.

In the composite membrane, as illustrated in FIG. 2, an air-permeable reinforcing material may be laminated on a surface of the hydrophobic porous membrane opposite to the surface of the hydrophobic porous membrane having the layer of the moisture-permeable resin laminated thereon. In addition, the air-permeable reinforcing material may be laminated on a surface of the reinforcing porous membrane opposite to the surface of the reinforcing porous membrane having the hydrophobic porous membrane laminated thereon. In this case, the air-permeable reinforcing material may be laminated via a layer of a hydrophilic resin exposed out of the upper surface of the reinforcing porous membrane. The air-permeable reinforcing material can be laminated, for example, by bonding to any of the hydrophobic porous membrane, the reinforcing porous membrane, or the layer of the hydrophilic resin or a combination of any thereof by thermal fusion or the like. The lamination of the air-permeable reinforcing material can increase the strength of the composite membrane.

Hereinbelow, a more detailed description will be given of each of the membranes and the layers constituting the composite membrane.

(ii) Layer of Moisture-Permeable Resin (Function Layer)

The layer of the moisture-permeable resin has an average thickness of 25 µm or less, preferably 10 µm or less, and more preferably 5 µm or less. Thinning of the average thickness of the layer can improve the water vapor permeability. The average thickness is preferably thinner as long as no pin hole occurs. However, the lower limit of the average thickness thereof is, for example, 1 µm or more (particularly, 2 µm or more).

An average thickness t of the layer of the moisture-permeable resin can be calculated according to the following expression after obtaining a cross sectional area A of the layer of the moisture-permeable resin and a length (width) L of the layer of the moisture-permeable resin through the observation of a cross section of the composite membrane using a scanning electron microscope.

Average thickness $t$=area $A$/length $L$

The moisture-permeable resin is preferably a water-resistant moisture-permeable resin having a high water resistance. The resin with the high water resistance can increase the durability of the composite membrane when used in a high temperature-high humidity environment (high temperature-high humidity resistant properties). In addition, the moisture permeability in the high temperature-high humidity environment also increases.

The water resistance of the water-resistant moisture-permeable resin can be evaluated based on a swelling degree obtained by the following water resistance test.

The swelling degree of the water-resistant moisture-permeable resin is, for example, 20 times or less, preferably 15 times or less, and more preferably 10 times or less. The lower limit of the swelling degree of the resin is not particularly limited but may be 2 times or more (particularly 5 times or more).

Water resistance test: the resin is allowed to stand for 24 hours in an environment with a temperature of 120° C. and a water vapor pressure of 0.23 MPa, and next, immersed in water at 25° C. for 15 minutes. Then, a volume change of the resin between before and after the test is measured to calculate the swelling degree based on the following expression.

Swelling degree=the volume of resin after the water resistance test/the volume of resin before the water resistance test Specific examples of the moisture-permeable resin include a polystyrene sulfonic acid, a polyvinyl alcohol, a urethane, vinyl alcohol copolymers (such as an ethylene-vinyl alcohol copolymer and a tetrafluoroethylene-vinyl alcohol copolymer), fluorine-based ion exchange resins (such as NAFION (registered trade mark) manufactured by DuPont, and FLEMION (registered trademark) manufactured by Asahi Glass Co., Ltd.), resins having protic hydrophilic groups in the repeating units thereof (protic hydrophilic resins), such as divinylbenzene sulfonic acid copolymers, divinylbenzene carboxylic acid copolymers, and other ion exchange resins, and resins having aprotic hydrophilic groups in the repeating units thereof (aprotic hydrophilic resins), such as a polyethylene oxide, a polyvinyl pyridine, a polyvinyl ether, a polyvinyl pyrrolidone, and a pyrrolidone.

In addition, the moisture-permeable resin may form a three-dimensionally crosslinked structure. Examples of the three-dimensionally crosslinked moisture-permeable resin include crosslinked products of the protic hydrophilic resins and crosslinked products of the aprotic hydrophilic resins. The three-dimensionally crosslinked moisture-permeable resins are excellent in water resistance.

The moisture-permeable resins (including the three-dimensionally crosslinked moisture-permeable resins) can be used alone or in combination of two or more kinds thereof. Preferable moisture-permeable resins are crosslinked polyvinyl alcohols (such as a crosslinked product of a liquid mixture of glutaraldehyde and HCl, a crosslinked product of formaldehyde, and a crosslinked product of blocked isocyanate), crosslinked polyurethanes (such as crosslinked products of polyether or polyester having a hydroxy group at both ends and aromatic diamine or polyhydric alcohol), and fluorine-based ion exchange resins. The crosslinked polyvinyl alcohols, which are not only excellent in water resistance but also easy to coat, can facilitate reduction of the thickness of the moisture-permeable resin layer. The crosslinked polyurethanes are excellent in water resistance, as well as in abrasion resistance, oxidation resistance, oil resistance, and aging resistance. The fluorine-based ion exchange resins are excellent in heat resistance and chemical resistance, and thus exhibit high durability in high temperature-high humidity conditions, systems containing an acid, an alkali, etc., and the like. Accordingly, the fluorine-based ion exchange resins are suitable for use in harder environments.

(iii) Reinforcing Porous Membrane

Figure 3:
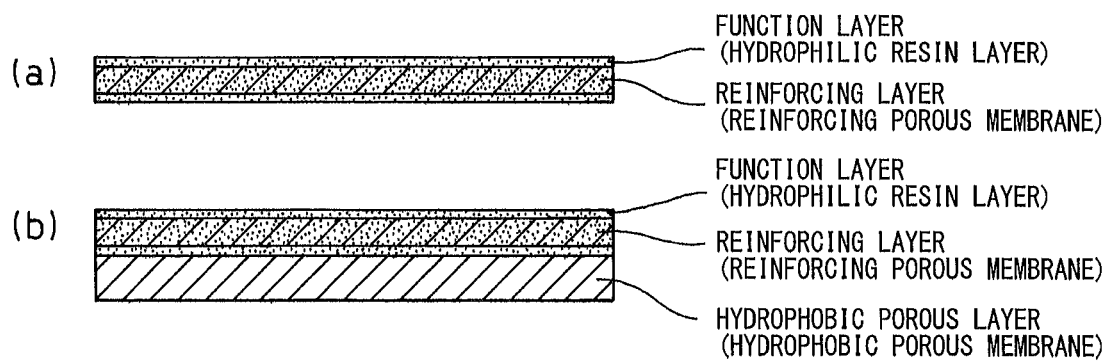
FIG. 3(a) is a schematic cross-sectional view of a layer of a moisture-permeable resin reinforced with a reinforcing porous membrane.
FIG. 3(b) is a schematic cross-sectional view of a composite membrane additionally provided with a hydrophobic porous membrane.

The layer of the moisture-permeable resin is included in the reinforcing porous membrane to be reinforced thereby. FIG. 3 illustrates one example of a composite membrane including such a layer of a moisture-permeable resin. FIG. 3(a) is a schematic cross-sectional view of a layer of a moisture-permeable resin reinforced by a reinforcing porous membrane, and FIG. 3(b) is a schematic cross-sectional view of a composite membrane including the layer of the moisture-permeable resin. The composite membrane of FIG. 3(b) can be produced as follows: a liquid containing the moisture-permeable resin is applied on or impregnated in the entire reinforcing porous membrane, then, one surface of the reinforcing porous membrane is covered with a hydrophobic porous membrane, and next, a solvent is removed. Alternatively, after applying or impregnating the liquid containing the moisture-permeable resin on or in one surface of the hydrophobic porous membrane, the surface applied or impregnated with the liquid is covered with a reinforcing porous membrane, and then, the solvent is removed, thereby producing the composite membrane. In addition, the liquid containing the moisture-permeable resin may be applied on or impregnated in an upper surface of the reinforcing porous membrane.

A membrane similar to a hydrophobic porous membrane described below can be used as the reinforcing porous membrane. The thickness of the reinforcing porous membrane can be appropriately adjusted in order to obtain a layer of the moisture-permeable resin having an intended even thickness.

(iv) Hydrophobic Porous Membrane

The hydrophobic porous membrane constitutes a part of the composite membrane and maintains air permeability while providing hydrophobicity to the composite membrane. The kind of the resin constituting the hydrophobic porous membrane is not particularly limited as long as the membrane has hydrophobicity and air permeability. Specifically, preferred are resins having heat resistance and corrosion resistance. Examples of such resins include polyolefins such as a polyethylene and a polypropylene; a polycarbonate; a polystyrene; a polyvinyl chloride; a polyvinylidene chloride; a polyester; and fluorocarbon polymers such as a polytetrafluoroethylene, tetrafluoroethylene-hexafluoropropylene copolymers, a polyvinyl fluoride, and a polyvinylidene fluoride.

Preferable hydrophobic porous membranes are porous membranes made of fluorocarbon polymers. Fluorocarbon polymers are excellent in heat resistance and corrosion resistance and have a significantly low critical surface tension, i.e., have a high hydrophobicity (water repellency). Even more preferable hydrophobic porous membranes are porous membranes made of an expanded polytetrafluoroethylene (ePTFE) (hereinafter may be referred to as "ePTFE membranes", "expanded porous PTFE membranes", or the like). ePTFE membranes allow the formation of extremely minute pores, thus increasing surface smoothness, so that the moisture-permeable resin layer can be easily formed into a thin and even layer. In addition, it is possible to increase the porosity of ePTFE membranes and thereby increasing the moisture permeability of a composite membrane obtained. Furthermore, ePTFE membranes are highly excellent in hydrophobicity, ensuring that an obtained composite membrane can inhibit the permeation of liquid.

Lamination processing of the hydrophobic porous membrane and the layer of the moisture-permeable resin may be performed by thermal fusion. However, when the hydrophobic porous membrane has a heat resistance less than that of the moisture-permeable resin, it is difficult to carry out the fusing process. Accordingly, use of a material having an excellent heat resistance for the hydrophobic porous membrane facilitates the fusing process with the layer of the moisture-permeable resin and also increases the latitude in selection of the material for the moisture-permeable resin.

An ePTFE membrane can be produced by molding a paste prepared by mixing a PTFE fine powder and a molding aid, removing the molding aid from the molded article, then expanding the article at a high temperature and a high speed, and additionally, as needed, sintering the article. The detail of the production is, for example, described in Japanese Examined Patent Publication No. 51-18991. The expansion may be uniaxial expansion or biaxial expansion. A uniaxially expanded porous PTFE film is characterized in that, microscopically, narrow island-shaped nodes (folded crystals) roughly orthogonal to an expansion direction are present and fibrils (bundles of linear molecules drawn out of the folded crystals molten due to expansion) in the shape of parallel lines linking the nodes are oriented in the expansion direction. On the other hand, a biaxially expanded porous PTFE film is microscopically characterized by having a cobweb-like fibrous structure in which fibrils spread radially and fibril-linking nodes are scattered like islands so that there are many spaces partitioned by the fibrils and the nodes. The biaxially expanded porous PTFE film is particularly suitably used, since the film can be more easily made wide than the uniaxially expanded porous PTFE film, and has well balanced physical properties between longitudinal and transverse directions, reducing the production cost per unit area.

The hydrophobic porous membrane has a maximum pore size of, for example, 15 µm or less, preferably 10 µm or less, and more preferably 5 µm or less. When the maximum pore size is too large, the application or impregnation of a mixture liquid containing the moisture-permeable resin in the production of the composite membrane causes the moisture-permeable resin to easily enter pores of the hydrophobic porous membrane. This may make it difficult to form a layer of the moisture-permeable resin. The smaller the maximum pore size, the easier the formation of an even moisture-permeable resin layer, whereby the occurrence of pin holes can be suppressed. The maximum pore size of the ePTFE membrane can be appropriately controlled by an expansion ratio and the like.

The maximum pore size can be determined by the following expression after obtaining a bubble point value according to a bubble point method (JIS K 3832) using isopropanol.

$$d = 4\gamma_{IPA} \cos \theta_1 / PB$$

(In the expression; d represents a maximum pore size; $\gamma_{IPA}$ represents a surface tension of isopropanol; $\theta_1$ represents a contact angle between isopropanol and a hydrophobic porous membrane (cos $\theta_1$=1, provided that the hydrophobic porous membrane is wet with IPA), and PB represents a bubble point value).

When the hydrophobic porous membrane has too small an average pore size, the air permeability and eventually the moisture permeability of the hydrophobic porous membrane are degraded, leading to the deterioration of the ability of the composite membrane to permeate moisture. Accordingly, the average pore size of the hydrophobic porous membrane is, for example, 0.05 μm or more, preferably 0.1 μm or more, and more preferably 0.2 μm or more.

The average pore size indicates a value obtained from a pore distribution (a volume distribution with respect to pore size). In other words, all pores of the porous membrane are assumed to be cylindrical to measure a distribution of the pores and then a pore size corresponding to an intermediate value of pore volumes is obtained as an average pore size. In the present specification, regarding the average pore size of the hydrophobic porous membrane, a COULTER POROMETER manufactured by Coulter Electronics, Inc., was used to obtain the average pore size.

The porosity of the hydrophobic porous membrane can be appropriately determined in accordance with the average pore size, and is, for example, 40% or more (preferably, 50% or more). In addition, the porosity thereof is, for example, about 98% or less (preferably, 90% or less). The porosity of the ePTFE membrane can be appropriately adjusted by an expansion ratio and the like, as with the average pore size described above.

The porosity of the hydrophobic porous membrane can be calculated based on the following expression, using a bulk density (D=W/V; unit: g/cm$^2$) obtained by measuring a mass W of the hydrophobic porous membrane and an apparent volume V including pores and a density $D_{standard}$ (2.2 g/cm$^3$ in PTFE resin) at which there is no pore formed. The thickness of the hydrophobic porous membrane used in the calculation of the volume V is based on an average thickness measured with a dial thickness gauge (measured under no load other than a main body spring load using "SM-1201" manufactured by Teclock Corporation).

$$\text{Porosity (\%)} = [1 - (D/D_{standard})] \times 100$$

The air permeability (JIS P 8117: 1998) of the hydrophobic porous membrane is, for example, 500 sec or less, and preferably 10 sec or less. When the value of the air permeability is too large, the moisture permeability of the composite membrane is deteriorated, causing the moisture permeability of the obtained composite membrane to be insufficient. In addition, when the composite membrane is used as a heat exchange membrane or a membrane for membrane distillation, the degradation of the heat exchange ability and the reduction of the separation efficiency occur. The air permeability means Gurley number. The Gurley number expresses a time required for 100 cm$^3$ of air to flow through an area of a square inch (642 mm$^2$). In the present specification, the air permeability is measured using an Oken type air-permeability tester "KG1" (trade name) manufactured by Asahi Seiko Co., Ltd., unless otherwise specified.

The thickness of the hydrophobic porous membrane is not limited, and for example, 100 μm or less, preferably 50 μm or less, and more preferably 25 μm or less. When the hydrophobic porous membrane is too thick, the ability of the composite membrane to permeate moisture is degraded, thereby deteriorating the heat exchange ability and reducing the separation efficiency when used as a membrane for membrane distillation. Conversely, when it is too thin, the gas barrier properties are degraded, causing permeation of liquid or salt or deteriorating the processability. Accordingly, the thickness of the hydrophobic porous membrane is, for example, 5 μm or more, preferably 10 μm or more, and more preferably 20 μm or more.

As described above, the present invention provides a composite of a hydrophobic porous membrane and a layer of a moisture-permeable resin reinforced by a reinforcing porous membrane. The surface roughnesses (pore size) of the porous membranes are much smaller than the fiber size of a nonwoven fabric, so that the formation of a pool of a moisture-permeable resin liquid can be prevented. As a result, a thin and even layer of the moisture-permeable resin is formed, eventually achieving high durability. In addition, the hydrophobic porous membrane itself serves to reinforce the entire composite membrane.

(v) Air-Permeable Reinforcing Material

The air-permeable reinforcing material is usually made of a fibrous resin. Use of the fibrous resin can facilitate the production of a reinforcing material having both air permeability and strength. The air-permeable reinforcing material made of the fibrous resin may be any of a woven fabric, a knitted fabric, a nonwoven fabric (such as a nonwoven fabric formed by thermal bonding, span bonding, or other production methods), and a net. The air-permeable reinforcing material is particularly preferably a nonwoven fabric.

(vi) Purpose of Use

The composite membrane of the present invention has high gas barrier properties and high moisture permeability. Thus, the composite membrane can be used advantageously as a separation membrane for selectively permeating water vapor contained in gas or liquid (a separation membrane for a moisture content adjustment module). Examples of uses of the composite membrane include a pervaporation membrane [a membrane for performing seawater desalination or separating water from another liquid (e.g. an alcohol such as ethanol)], a dehumidification membrane, and a humidification membrane.

In the moisture content adjustment module, a fluid that supplies water (including a fluid to be dehydrated) is run onto one surface of the composite membrane having the moisture-permeable resin layer and a fluid that receives the water (including a dehydrating fluid) is run onto the other surface thereof, where flow channel control is performed so as not to cause mixing of the water-supplying fluid and the water-receiving fluid.

The moisture content adjustment module is preferably a flat-membrane stacked module, in which the water-supplying fluid and the water-receiving fluid are run in counterflow directions.

Figure 4:
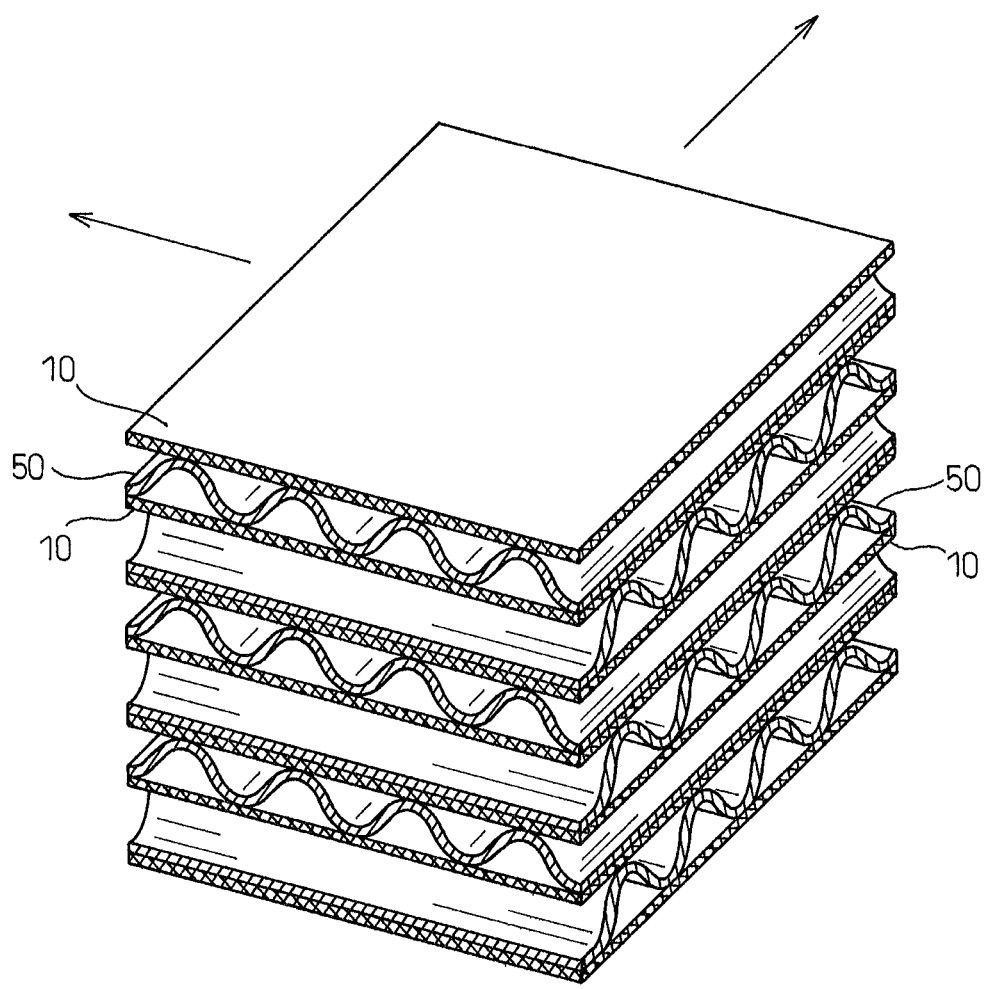
FIG. 4 is a schematic perspective cross-sectional view depicting one example of a moisture content adjustment module.

In a moisture permeation module, composite membranes are stacked. The stacked composite membranes are spaced apart from each other at a predetermined distance by spacers or the like. For example, as illustrated in FIG. 4, there is an embodiment formed by stacking composite membranes 10 and corrugated spacers 50. Formation of gaps on both sides of the composite membranes allows the use of the gaps as fluid channels, whereby moisture exchange is performed between the fluids on both sides to allow the adjustment of moisture content.

In addition, in the composite membrane of the present invention, the use of a water-resistant moisture-permeable resin as the moisture-permeable resin can increase the gas barrier properties and the moisture permeability even in high temperature-high humidity conditions. Accordingly, the composite membrane of the invention can be used advantageously also as a separation membrane for selectively permeating water vapor from high temperature-high humidity gas (e.g. a humidification membrane for using water vapor contained in an exhaust gas from a fuel cell electrode (particularly the exhaust gas from the air electrode) to humidify a gas supplied to the fuel electrode or the air electrode (particularly the fuel electrode)).

EXAMPLES

Hereinbelow, the present invention will be described in more detail with reference to Examples. However, it should be appreciated that the invention is not limited to the following Examples and also can obviously be implemented by appropriately adding modifications within the purport of the invention described above and below. Such modifications are all encompassed within the technical range of the invention.

Preparation of Composite Membrane

Example 1

As a reinforcing porous membrane, there was prepared an ePTFE membrane (manufactured by Japan Gore-Tex Inc., average thickness: 4 average pore size: 0.3 µm, maximum pore size: 0.5 µm, porosity: 80%, Gurley number: 0.9 seconds, and tensile strength MD: 1.0 N, TD: 1.2 N).

As a hydrophobic porous membrane, there was prepared an ePTFE membrane (manufactured by Japan Gore-Tex Inc., average thickness: 40 µm, average pore size: 0.2 µm, maximum pore size: 0.4 µm, porosity: 86%, Gurley number: 5.4 seconds, and tensile strength: MD 1.2 N, TD 1.8 N).

As a moisture-permeable resin solution, there was prepared a fluorine-based ion exchange resin ("FLEMION (trade name)" manufactured by Asahi Glass Co., Ltd, in a solid content 9% ethanol solvent (EtOH/H$_2$O=50/50)).

The moisture-permeable resin was impregnated from both surfaces of the reinforcing porous membrane. Simultaneously with the impregnation, the hydrophobic porous membrane was placed and attached onto one of the surfaces of the reinforcing porous membrane. The applied moisture-permeable resin was dried for 1 minute at 130° C.

As an air-permeable reinforcing material, there was prepared a thermal bond nonwoven fabric ("9820F (trade name)" manufactured by Shinwa Corporation) using a polyester fiber ("MELTY (trade name)" manufactured by Unitika Fiber Co., Ltd, 2.2 dtex). The air-permeable reinforcing material was thermally fused (for 3 minutes at 150° C. under a load of 500 kPa) onto a surface of the hydrophobic porous membrane opposite to the surface of the hydrophobic porous membrane having the moisture-permeable resin applied thereon to form a composite membrane with the nonwoven fabric of Example 1.

Comparative Example 1

A composite membrane was formed in the same manner as Example 1 except for not using a reinforcing porous membrane.

(Evaluation)

Evaluation was performed regarding the moisture permeability, the mechanical strength, and the durability of each of the composite membranes of Example 1 and Comparative Example 1. Respective evaluation methods and evaluation results will be described in detail below.

(1) Moisture Permeability

The room temperature moisture permeabilities (in accordance with JIS L 1099E-1 method) of the obtained composite membranes with the nonwoven fabric were measured. Table 1 indicates the measurement results.

TABLE 1

| | Example 1 with reinforcing layer | Comparative Example 1 without reinforcing layer |
|---|---|---|
| Moisture Permeability [g/m$^2$/24 h] | 26,323 | 26,844 |

The results showed that there was almost no influence of the presence or absence of the reinforcing layer on the moisture permeability.

(2) Mechanical Strength

Evaluation was performed regarding the influence of the presence or absence of the reinforcing porous membrane on the mechanical strength of the layer of the moisture-permeable resin (function layer). In order to eliminate the influences of the hydrophobic porous membrane and the air-permeable reinforcing material on the improvement of mechanical strength, the hydrophobic porous membrane and the air-permeable reinforcing material were removed from the composite membranes with the nonwoven fabric of Example 1 and Comparative Example 1 to prepare sample membranes. Using a tensile tester, at an environment temperature and humidity (23° C., 50% RH) under room temperature conditions or at an environment temperature and humidity (60° C., 100% RH) under high temperature-high humidity conditions, the mechanical strength was measured at an initial chuck-to-chuck distance of 80 mm, with a test piece having a 10 mm-width rectangular shape, and at a tensile speed of 200 mm/min. There were obtained the strength at which the tensile force was at maximum and the elongation at which the sample was broken off. In addition, the modulus of elasticity used was the value at which the elongation was 2%. Table 2 indicates the results.

TABLE 2

| Mechanical Strength | | | | |
|---|---|---|---|---|
| Functional layer | | Example 1 with reinforcement | | Comparative Example 1 without reinforcement |
| MD/TD | | MD | TD | — |
| Maximum point stress [MPa] | 23 C./50% RH | 43.3 | 43.2 | 16 |
| | 60 C./100% RH | 31.3 | 28.8 | 12.3 |
| Elongation at break [% GL] | 23 C./50% RH | 85 | 81 | 96 |
| Modulus of Elasticity [MPa] | 23 C./50% RH | 1051 | 547 | 285 |

The results showed that the presence of the reinforcing porous membrane significantly improved the mechanical strength. In other words, the inclusion of the layer of the moisture-permeable resin (function layer) in the reinforcing porous membrane significantly improved the durability.

It should be noted that under the high temperature-high humidity conditions, the mechanical strength of the test piece with the reinforcing porous membrane improved. When the composite membrane of the present invention is actually used as a separation membrane for a moisture content adjustment module, such as a dehumidification membrane, a humidification membrane, or a pervaporation membrane, the use of the membrane under high temperature-high humidity conditions is expected. In other words, it has been shown that the composite membrane of the present invention has a high mechanical strength under high temperature-high humidity conditions close to the actual conditions of use.

(3) Durability

Figure 5:
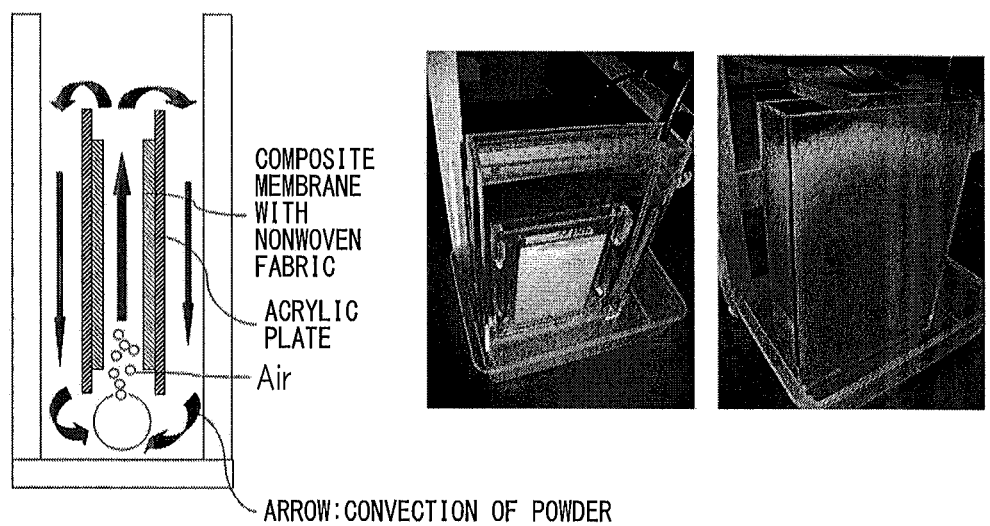
FIG. 5 is a view for illustrating an outline of a durability testing apparatus.

A durability testing apparatus illustrated in FIG. 5 was used to test the durabilities of the composite membranes with nonwoven fabric of Example 1 and Comparative Example 1. In the durability testing apparatus, each of the composite membranes with nonwoven fabric was set, water was poured, and then a test powder was dispersed at 10 wt % in the water. The durability testing apparatus was able to cause air bubbling to stir the test powder for 14 days. The stirred test powder was brought into contact with the composite membrane with nonwoven fabric set in the durability testing apparatus. The composite membranes with nonwoven fabric before and after the durability test were subjected to an analysis by Fourier transform infrared spectroscopy (an FT-IR measurement apparatus: SPECTRUM 100 manufactured by Perkin Elmer, Inc.; measurement conditions: the measurement was performed in a range of 4000 to 400 $cm^{-1}$ by ATR method).

In the composition of the test powder, $SiO_2$ was 95% and ignition losses of $Fe_2O_3$, $Al_2O_3$, $TiO_2$, and MgO were 5% or less. The test powder had a particle density of 2.6 to 2.7 $g/cm^3$. The particle size distribution is as indicated in Table 3. The term "over-sized" in the Table means the ratio of powder (particles) having a larger particle size than a designated particle size to an entire powder (particles). For example, the ratio of a powder having a larger particle size than 45 µm to the entire powder is 100%, and the ratio of a powder having a larger particle size than 75 µm to the entire powder is about 90%. Accordingly, the ratio of the powder having particle sizes ranging from 45 to 75 µm is about 10% (100-90). In addition, the ratio of a powder having a larger particle size than 106 µm is about 80%, and accordingly, the ratio of the powder having particle sizes ranging from 75 to 106 µm is about 10% (90-80).

TABLE 3

Particle Size Distribution of Durability Test Powder

| Particle size [µm] | Over-sized (%) |
| --- | --- |
| 45 | 100 |
| 75 | 90 ± 3 |
| 106 | 80 ± 3 |
| 150 | 65 ± 3 |
| 212 | 45 ± 3 |
| 300 | 1 or less |

The composite membranes with nonwoven fabric were subjected to an FT-IR analysis before and after the durability test. The composite membranes with nonwoven fabric used were the composite membrane with the reinforcing layer of Example 1 and the composite membrane without a reinforcing layer of Comparative Example 1. The composite membrane without the reinforcement had peak height changes on the FT-IR chart before and after the durability test. In particular, the changes included a deeper trough near 500 $cm^{-1}$ after the durability test and a shallower trough near 1000 cm-1 thereafter. The composite membrane with the reinforcement had almost no peak change on the FT-IR before and after the durability test. In other words, it seems that the surface of the composite membrane without the reinforcement changed before and after the durability test, whereas the surface of the composite membrane with the reinforcement had almost no change therebefore and thereafter.

In order to investigate the change on the surface of the composite membrane without the reinforcement, a comparison was made between the FT-IR charts of the composite membrane without the reinforcement and an ePTFE alone. In the composite membrane without the reinforcement, the trough near 500 $cm^{-1}$ became deeper after the durability test. This was very similar to a trough near 500 $cm^{-1}$ of the ePTFE. Thus, it seems that the non-reinforced function layer (the layer of the moisture-permeable resin) is abraded due to the durability test to cause the exposure of the hydrophobic porous membrane (ePTFE membrane) under the function layer. Additionally, the composite membrane without the reinforcement had a shallower trough near 1000 $cm^{-1}$ after the durability test. The chart of the ePTFE is flat near 1000 $cm^{-1}$ and does not have a peak. This seems to suggest that the trough near 1000 $cm^{-1}$ appears due to the material of the function layer (the layer of the moisture-permeable resin), and that the function layer is abraded due to the durability test, causing the trough appearing near 1000 $cm^{-1}$ to be shallower.

The results seem to indicate that in the composite membrane without the reinforcement, the function layer (the layer of the moisture-permeable resin) is abraded due to the durability test to cause the exposure of the hydrophobic porous membrane (ePTFE membrane) under the function layer. On the other hand, the composite membrane with the reinforcement had almost no change in the surface component even after the durability test. In other words, it seems that the function layer (the layer of the moisture-permeable resin) remained sound without abrasion.

DESCRIPTION OF REFERENCE NUMERALS

10: Composite membrane
50: Spacer

The invention claimed is:

1. A composite membrane comprising:
    a reinforcing porous membrane;
    a hydrophobic porous membrane; and
    a layer of moisture-permeable resin formed on an upper surface and impregnated within the reinforcing porous membrane,
    wherein a lower surface of the reinforcing porous membrane is attached to the hydrophobic porous membrane.

2. The composite membrane according to claim 1, wherein the layer of the moisture-permeable resin is exposed out of the lower surface of the reinforcing porous membrane.

3. The composite membrane according to claim 2, wherein at least a part of the layer of the moisture-permeable resin exposed out of the lower surface of the reinforcing porous membrane is included into the hydrophobic porous membrane but is not exposed out of a lower surface of the hydrophobic porous membrane.

4. The composite membrane according to claim 1, wherein the layer of the moisture-permeable resin has a thickness of 25 µm or less.

5. The composite membrane according to claim 1, wherein the layer of the moisture-permeable resin has a thickness of 10 µm or less.

6. The composite membrane according to claim 1, wherein the layer of the moisture-permeable resin has a thickness of 5 µm or less.

7. The composite membrane according to claim 1, wherein the moisture-permeable resin has swelling properties in which a swelling degree obtained from a volume change of the resin between before and after a water resistance test as described below is from 2 to 20 times;
    the swelling degree=the resin volume after the water resistance test/the resin volume before the water resistance test; and the water resistance test: the resin is allowed to stand for 24 hours in an environment with a temperature of 120° C. and a water vapor pressure of 0.23 MPa and then immersed in water with a temperature of 25° C. for 15 minutes.

8. The composite membrane according to claim 1, wherein the moisture-permeable resin is any of a polystyrene sulfonic acid, a polyvinyl alcohol, a vinyl alcohol copolymer, a fluorine-based ion exchange resin, a resin having a protic hydrophilic group in the repeating unit thereof, and a resin having an aprotic hydrophilic group in the repeating unit thereof.

9. The composite membrane according to claim 1, wherein the moisture-permeable resin is any of a fluorine-based ion exchange resin, a polyvinyl alcohol, and a polyurethane.

10. The composite membrane according to claim 1, wherein the reinforcing porous membrane is an expanded PTFE membrane.

11. The composite membrane according to claim 1, further comprising an air-permeable reinforcing material laminated on a lower surface of the hydrophobic porous membrane opposite to an upper surface of the hydrophobic porous membrane having the reinforcing porous membrane attached thereon.

12. The composite membrane according to claim 11, wherein the air-permeable reinforcing material is any of a woven fabric, a nonwoven fabric, and a net.

13. The composite membrane according to claim 1, wherein the composite membrane is used as a water vapor separation membrane.

\* \* \* \* \*